Patented Sept. 4, 1945

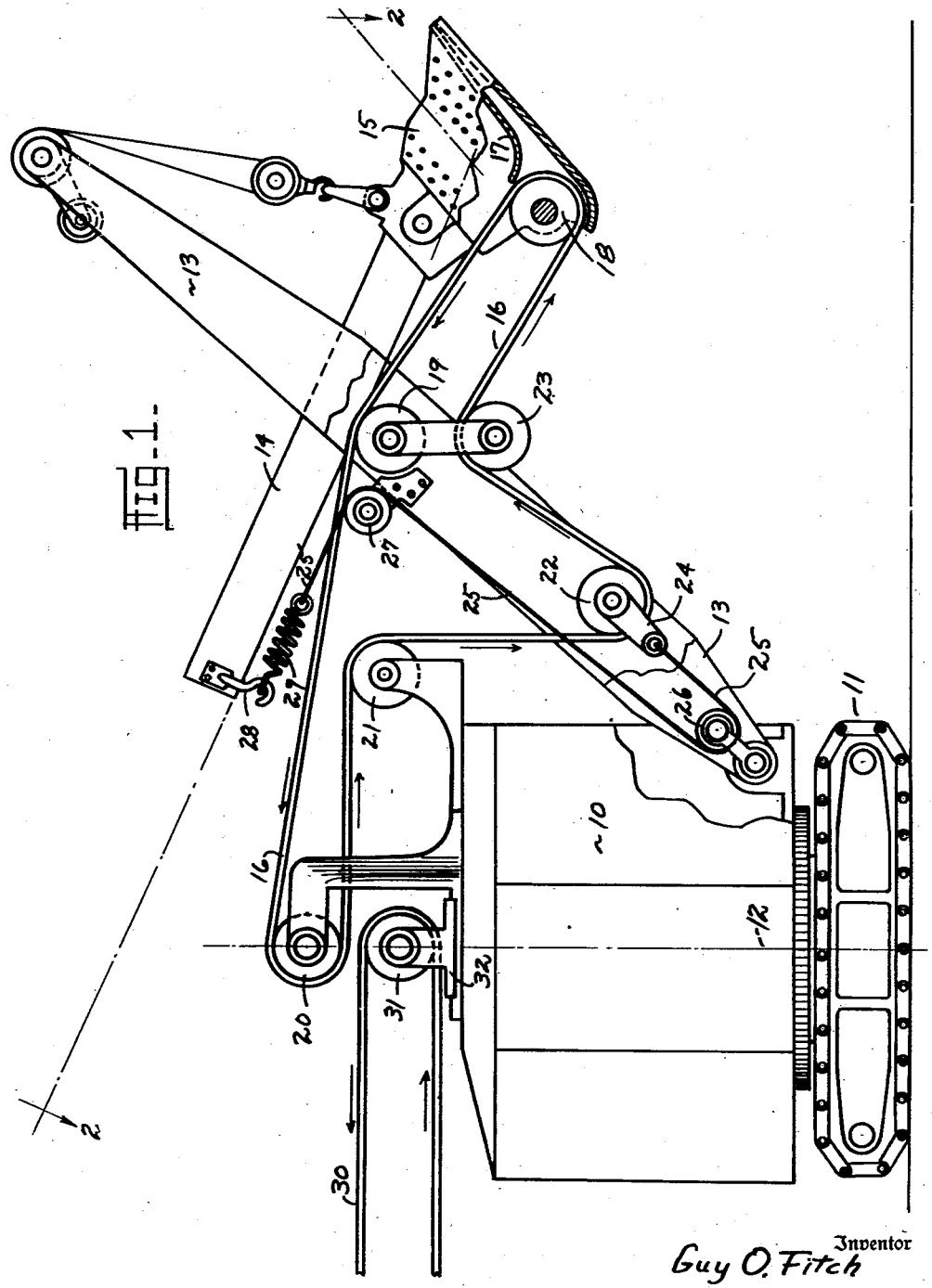

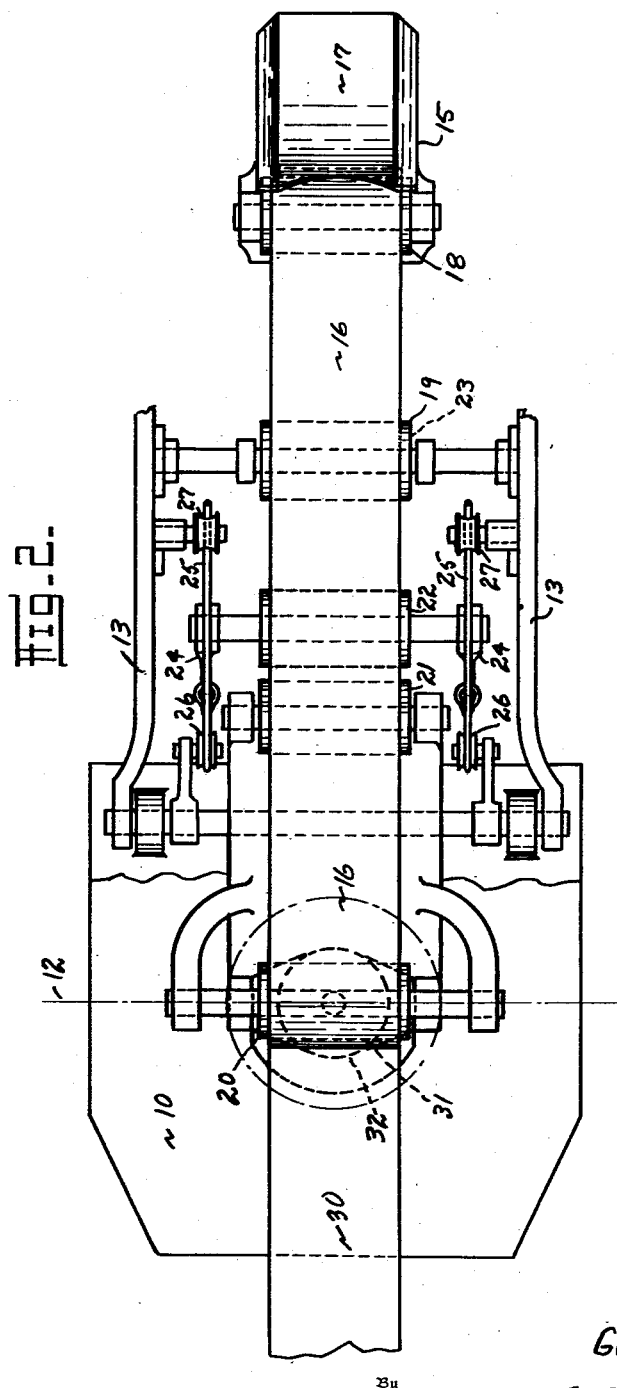

2,384,242

UNITED STATES PATENT OFFICE 2,384,242

POWER SHOVEL AND CONVEYER

Guy O. Fitch, Columbiana, Ohio

Application March 20, 1944, Serial No. 527,295

3 Claims. (Cl. 214—90)

This invention relates to a power shovel and more particularly to a power shovel equipped with a conveyer.

The principal object of the invention is the provision of a power shovel incorporating a conveyer mechanism for continuously removing material being handled by the shovel from the dipper thereof.

A further object of the invention is the provision of a power shovel having a conveyer mechanism incorporated therewith and so arranged that the shovel may be operated through its normal radius and at the same time continuously remove the material handled to a given location.

A still further object of the invention is the provision of a power shovel provided with a conveyer mechanism and incorporating means for varying the effective length of the conveyer mechanism in direct ratio to the operating positions of the material handling portions of the shovel.

The shovel and conveyer mechanism illustrated and described herein has been designed to enable a power shovel to continuously handle material in contrast with the heretofore necessary procedure of alternately handling material and swinging the entire shovel on its axis to permit the material being handled to be disposed of, the point of disposal being usually at a considerable distance from the point of material pick up. In the present disclosure the power shovel and conveyer combination may continuously be employed in picking up material as the materials continuous removal from the dipper portion of the shovel is effected by means of an integrally formed conveyer mechanism which is so designed as to permit it to adjust its effective length to the various operating portions of the shovel. The material being handled moves backwardly over the uppermost portion of the cab of the shovel and is deposited at a point approximately on the center line of the shovel directly on a secondary conveyer which may obviously be extended to a given location such as a hopper from which trucks or railroad cars may be filled thus enabling the power shovel and conveyer mechanism to operate continuously rather than the heretofore customary procedure of alternately picking up material, swinging about and disposing of it.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a side elevation of the power shovel mechanism.

Figure 2 is a top plan view taken on lines 2—2 of Figure 1.

By referring to the drawings and Figure 1 in particular it will be seen that the power shovel and conveyer mechanism comprises a more or less conventional power shovel in which a cab is indicated by the numeral 10 and the customary underframe including the usual caterpillar tread assemblies is indicated by the numeral 11. The rotating pivot point of the cab 10 with respect to the underframe 11 is indicated by a center line 12. The boom pivotally affixed to the cab structure is indicated by the numeral 13. The stick which is mounted for movement with respect to the boom 13 is indicated by the numeral 14 and a modified form of dipper 15 is positioned on the stick 14 in the customary manner. The dipper and stick actuating mechanisms are conventional and are subject to the control of the operator in the cab 10 in accordance with standard practice. In the present disclosure a conveyer mechanism consisting of a conveyer belt 16 is incorporated with the shovel structure and so arranged as to operate in effective relation therewith for the continuous removal of material from the dipper 15. By referring to the dipper 15 it will be observed that a broken away section permits the interior thereof to be illustrated and it will be seen that a false bottom member 17 is so arranged that material being handled is brought into contact with the effective surface of the belt 16 of the conveyer mechanism. An idler roll 18, the surfaces of which are preferably somewhat concave, is positioned in the back portion of the dipper 15 to permit the effective turning of the conveyer belt 16. The uppermost section of the conveyer belt 16 moves upwardly and backwardly continuously being powered by suitable means, preferably electric motors integrally formed with one or more of the idler rolls the surfaces of which are also somewhat concave, over which the conveyer belt is positioned. Directional arrows in Figure 1 indicate the direction of travel of the conveyer belt 16. It will be observed that the conveyer belt 16 after leaving the idler roll 18 in the dipper 15 travels upwardly and over an idler roll 19 which is positioned between the two principal frame members of the boom 13 and the location of which corresponds with the pivot point or shaft by means of which the stick 14 is pivoted on the boom 13. From this point the conveyer belt 16 extends backwardly to a point immediately over the cab 10 and approximately on the center line 12 thereof where it passes around an idler roll 20 which effectively reverses its movement. Now traveling forward having disposed of any material it had been carrying, the belt 16 on its return to the dipper 15 passes over an idler roll 21 positioned at a point just forward of the cab 10 of the shovel and then downwardly and beneath a tensioned idler roll 22 and then forward and upwardly and over an idler roll 23 from whence it continues forwardly and downwardly to the idler roll 18 in the dipper 15. It will be observed that the idler roll 22 and the idler roll 23 are capable of travel, the idler roll 22 being positioned with respect to the boom 13 and the conveyer belt 16 by means of a movable frame 24 which in turn is affixed to and held by cables 25. Still referring to Figure 1 it will be seen that the cable 25 is passed over a pivot 26 in the base of the boom 13 and then extends upwardly along the uppermost surface of the boom 13 and passes partially around a pivot 27 and extends upwardly and backwardly to a connection 28 on the upper portion of the stick 14, a spring or other suitable tensioning means 29 being utilized as a connecting means so that necessary tension is always exerted through the cables 25 over the pivots 27 and 26 and by means of the frame 24 on the idler roll 22 which in turn tensions the conveyer belt 16 and serves as an automatic pick up to compensate for the operating positions of the dipper 15 and stick 14 with respect to the position of the idler roll 19 over which the conveyer belt passes.

It will thus be seen that at such times as the dipper 15 is moved outwardly and/or downwardly with respect to the position illustrated in Figure 1, the idler roll 22 of necessity rises, thereby permitting the effective material handling length of the conveyer belt 16 to be lengthened in direct relation to the extended position of the stick 14. This is possible because the cables 25 are connected by means of the connection 22 with the stick 14. The arrangement illustrated and described makes possible the conventional operation of the dipper and stick and boom portions of the power shovel as in excavating any material or in handling loosely piled material, the conveyer belt 16 effectively and continuously removing the material handled from the dipper 15 to a location over the cab 10.

Still referring to Figure 1, it will be observed that when the material being handled by the conveyer belt 16 reaches the idler roll 20 it will fall by gravity from the belt 16 and onto a secondary conveyer taking the form of a belt 30, which belt 30 is positioned over an idler roll 31 on a frame 32. The frame 32 is rotatably positioned on the cab 10 and on the approximate vertical center line 12 thereof so that material received on the upper surface of the belt 30 may be moved backwardly from the cab, that is to the left of the drawings, as illustrated in Figure 1, to a location which may, if desired, comprise a receiving hopper from which the material being handled can be loaded into trucks, cars, barges or the like. It is obvious that one or more additional conveyer units may be utilized to reach a given location and that the whole arrangement makes it possible for the shovel to advance into the area from which it is removing material and continuously handle that material without the necessity of alternately handling material and swinging about to dispose of the same.

By referring to Figure 2 of the drawings, a top plan view of the conveyer mechanism positioned on the boom and stick and cab portions of the power shovel may be seen and it will be observed that the various frames necessary for holding the various idler rolls have been purposely illustrated as relatively wide spaced so as to enable a clear understanding of the operating principles of the device. Still referring to Figure 2 it will be seen that a continuous conveyer is formed by the mechanism which leaves the dipper 15, passes upwardly between the structural frame members of the boom 13 and backwardly over the top of the cab and deposits its material upon a secondary conveyer which in turn leaves the shovel area.

It will thus be seen that the several objects of the invention are accomplished by the device illustrated and described and that in addition to these objects the further advantage of economical operation is achieved in that the continuous operation of the shovel in direct material handling increases the material handled in a given time by more than double the amount conventionally handled as the complete time heretofore thought necessary for disposing of the material after it had once been received in the dipper has been eliminated.

Having thus described my invention, what I claim is:

1. The combination with a power shovel having a cab mounted on ground engaging means and rotatable about a central vertical axis thereof, a boom and a stick carried on said boom and a dipper on said stick, of means for removing material from said dipper, said means consisting of a continuous conveyer, said continuous conveyer supported and driven by rollers on said shovel structure, and terminating near the said vertical center axis of said cab.

2. A conveyer system for a rotatable power shovel said system comprising a plurality of rollers positioned on said shovel structure and a continuous conveyer positioned on said rollers and driven thereby, one end of said continuous conveyer being located in the dipper of the shovel and the other being located near the vertical center line of the shovel.

3. In a conveyer mechanism for a rotatable power shovel, a continuous conveyer mounted over rollers on said shovel and extending from the dipper of the said shovel to a location near the vertical axis of said shovel and means for taking up or extending the effective length of the conveyer to accommodate it to the working of the shovel, and a secondary continuous conveyer extending from in under the first mentioned continuous conveyer and away from said shovel.

GUY O. FITCH.